United States Patent
Min

(10) Patent No.: US 10,247,873 B2
(45) Date of Patent: Apr. 2, 2019

(54) LIGHTING DEVICE OF VEHICLE

(71) Applicant: HYUNDAI MOBIS Co., Ltd., Yongin-si, Gyeonggi-do (KR)

(72) Inventor: Kyung Gu Min, Yongin-si (KR)

(73) Assignee: HYUNDAI MOBIS Co., Ltd., Yongin-si (KR)

(*) Notice: Subject to any disclaimer, the term of this patent is extended or adjusted under 35 U.S.C. 154(b) by 173 days.

(21) Appl. No.: 15/346,313

(22) Filed: Nov. 8, 2016

(65) Prior Publication Data

US 2017/0356615 A1 Dec. 14, 2017

(30) Foreign Application Priority Data

Jun. 9, 2016 (KR) .................. 10-2016-0071491

(51) Int. Cl.
*F21S 8/00* (2006.01)
*F21V 8/00* (2006.01)
(Continued)

(52) U.S. Cl.
CPC ............ *G02B 6/0073* (2013.01); *F21S 43/14* (2018.01); *F21S 43/19* (2018.01); *F21S 43/195* (2018.01);
(Continued)

(58) Field of Classification Search
CPC ...... F21S 48/1241; F21S 41/24; F21S 41/143; F21S 43/237; F21S 43/247; F21S 43/14;
(Continued)

(56) References Cited

U.S. PATENT DOCUMENTS 5,590,945 A * 1/1997 Simms ................ G02B 6/0038
362/623
7,695,175 B2 * 4/2010 Futami ..................... F21V 7/09
362/511
(Continued)

FOREIGN PATENT DOCUMENTS

JP 2006-93104 A 4/2006
JP 2013-62110 A 4/2013
(Continued)

OTHER PUBLICATIONS

Office Action dated May 1, 2017 of corresponding Korean Patent Application No. 10-2016-0071491—7 pages.

*Primary Examiner* — Anabel Ton
(74) *Attorney, Agent, or Firm* — Knobbe Martens Olson & Bear LLP

(57) ABSTRACT

Disclosed is a lighting device of a vehicle capable of achieving an enhancement in luminous efficacy. The disclosed lighting device includes a light source for generating light, a light guide including a light emitting portion formed with first patterns arranged in a longitudinal direction of the light emitting portion, to guide the light, the light emitting portion performing light emission using the light, and a light receiving portion to receive the light generated by the light source, and a back cover, on which the light guide is mounted. The back cover is formed with second patterns arranged in a longitudinal direction of the back cover at a portion of the back cover, on which the light receiving portion is mounted. The first patterns are formed to have a greater width with increasing distance from the light source. The second patterns are formed to have the same width.

12 Claims, 10 Drawing Sheets

(51) Int. Cl.
- *F21S 43/14* (2018.01)
- *F21S 43/27* (2018.01)
- *F21S 43/237* (2018.01)
- *F21S 43/245* (2018.01)
- *F21S 43/247* (2018.01)
- *F21S 43/19* (2018.01)

(52) U.S. Cl.
CPC ............ *F21S 43/237* (2018.01); *F21S 43/245* (2018.01); *F21S 43/247* (2018.01); *F21S 43/27* (2018.01); *G02B 6/001* (2013.01); *G02B 6/0006* (2013.01); *G02B 6/0013* (2013.01); *G02B 6/0033* (2013.01); *G02B 6/0096* (2013.01)

(58) Field of Classification Search
CPC ........ F21S 43/27; F21S 43/239; F21S 43/245; F21S 43/235; F21S 43/127; F21S 43/242
See application file for complete search history.

(56) References Cited

U.S. PATENT DOCUMENTS

| | | | | |
|---|---|---|---|---|
| 9,669,754 B2 * | 6/2017 | Tatara | ..................... | B60R 11/04 |
| 2003/0210557 A1 * | 11/2003 | Wu | ..................... | H04N 1/02815 362/555 |
| 2004/0136198 A1 * | 7/2004 | Wimbert | ............... | B60Q 1/2665 362/507 |
| 2006/0062016 A1 | 3/2006 | Dejima et al. | | |
| 2011/0267833 A1 | 11/2011 | Verrat-Debailleul et al. | | |
| 2013/0003398 A1 * | 1/2013 | Godbillon | .............. | G02B 6/001 362/511 |
| 2013/0242586 A1 * | 9/2013 | Huizen | ..................... | B60R 1/12 362/494 |
| 2015/0092433 A1 * | 4/2015 | Gloss | ....................... | F21S 41/24 362/511 |
| 2015/0109805 A1 | 4/2015 | Verrat-Debailleul et al. | | |
| 2016/0103269 A1 * | 4/2016 | Narita | ...................... | G02B 6/00 362/617 |
| 2017/0097135 A1 * | 4/2017 | Fritz | ................. | B29D 11/00721 |
| 2018/0112847 A1 * | 4/2018 | Childress | ................ | F21S 41/24 |

FOREIGN PATENT DOCUMENTS

| | | |
|---|---|---|
| KR | 10-2008-0067894 A | 7/2008 |
| KR | 10-2011-0021474 A | 3/2011 |
| KR | 10-2011-0081307 A | 7/2011 |

* cited by examiner

LIGHTING DEVICE OF VEHICLE

CROSS-REFERENCE TO RELATED APPLICATION

This application claims the priority benefit of Korean Patent Application No. 10-2016-0071491 filed on Jun. 9, 2016 in the Korean Intellectual Property Office, the disclosures of which are incorporated herein by reference.

BACKGROUND OF THE INVENTION

1. Field of the Invention

The present invention relates to a lighting device of a vehicle, and more particularly to a lighting device of a vehicle including a light guide to achieve light emission using light passing therethrough after being generated by a light source.

2. Description of the Related Art

Generally, various lighting devices are mounted to a vehicle, to provide convenience and safety when driving the vehicle. Such lighting devices include headlamps, tail lamps, and turn signal lamps.

To meet recent tendencies in vehicle design, efforts to develop a lighting device including a light guide for guiding light from a light source to be emitted after being totally or partially reflected by patterns formed at an inner surface of the light guide while passing through the light guide, for achievement of indirect lighting without direct exposure of the light source, are being made.

Such a light guide is made of a flexible material such as silicon while having a certain length and, as such, may be mounted to a vehicle in a state of being bent to take various shapes. Accordingly, the light guide may provide various lamp images and, as such, an improvement in vehicle design may be achieved.

The light guide is mounted to a back cover. The back cover supports the light guide, which is made of a flexible material, and, as such, the light guide may maintain a shape thereof mounted to the vehicle.

The light guide receives light generated by a light source at one end thereof. The received light is moved to the other end of the light guide along the length of the light guide by a pattern formed at an inner surface of the light guide. Thus, the light guide emits light.

Since the light guide has a certain length, light loss may be generated during movement of light from one end of the light guide to the other end of the light guide. For this reason, the light guide may nonuniformly emit light and, as such, dark areas may be formed.

SUMMARY OF THE INVENTION

Therefore, the present invention has been made in view of the above problems, and it is an object of the present invention to provide a lighting device of a vehicle, which is capable of achieving an enhancement in luminous efficacy.

Objects of the present invention are not limited to the above-described objects, and other objects of the present invention not yet described will be more clearly understood by those skilled in the art from the following detailed description.

In accordance with an aspect of the present invention, the above and other objects can be accomplished by the provision of a lighting device of a vehicle including a light source for generating light, a light guide including a light emitting portion formed with a plurality of first patterns arranged in a longitudinal direction of the light emitting portion, to guide the light, the light emitting portion performing light emission using the light, and a light receiving portion to receive the light generated by the light source, and a back cover, on which the light guide is mounted, the back cover being formed with a plurality of second patterns arranged in a longitudinal direction of the back cover at a portion of the back cover, on which the light receiving portion is mounted, wherein the plurality of first patterns is formed to have a greater width with increasing distance from the light source, and the plurality of second patterns is formed to have the same width.

Detailed matters of other embodiments may be apparent from the following description and the accompanying drawings.

The vehicle lighting device according to the aspect of the present invention may provide a uniform lighting image without forming dark areas because the plurality of first patterns, which has a greater width with increasing distance from the light source, is formed at the light emitting portion of the light guide.

In addition, since the plurality of second patterns, which has the same width, is formed at a portion of the back cover, on which the light emitting portion of the light guide is mounted, it may be possible to prevent the first patterns from being non-uniformly viewed at the outside of the light guide in an OFF state of the light source.

Effects of the present invention are not limited to the above-described effects. Other effects not yet described may be clearly understood by those skilled in the art from the accompanying claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Hereinafter, vehicle lighting devices according to embodiments of the present invention will be described with reference to the accompanying drawings.

Figure 1:
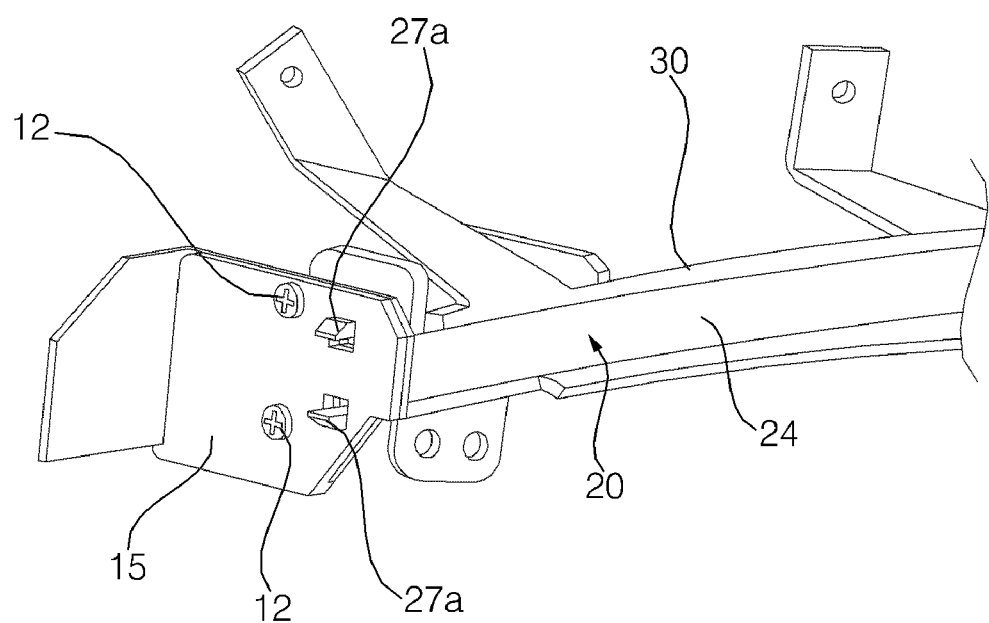
FIG. 1 is a view illustrating a lighting device of a vehicle according to an exemplary embodiment of the present invention.
Figure 2:
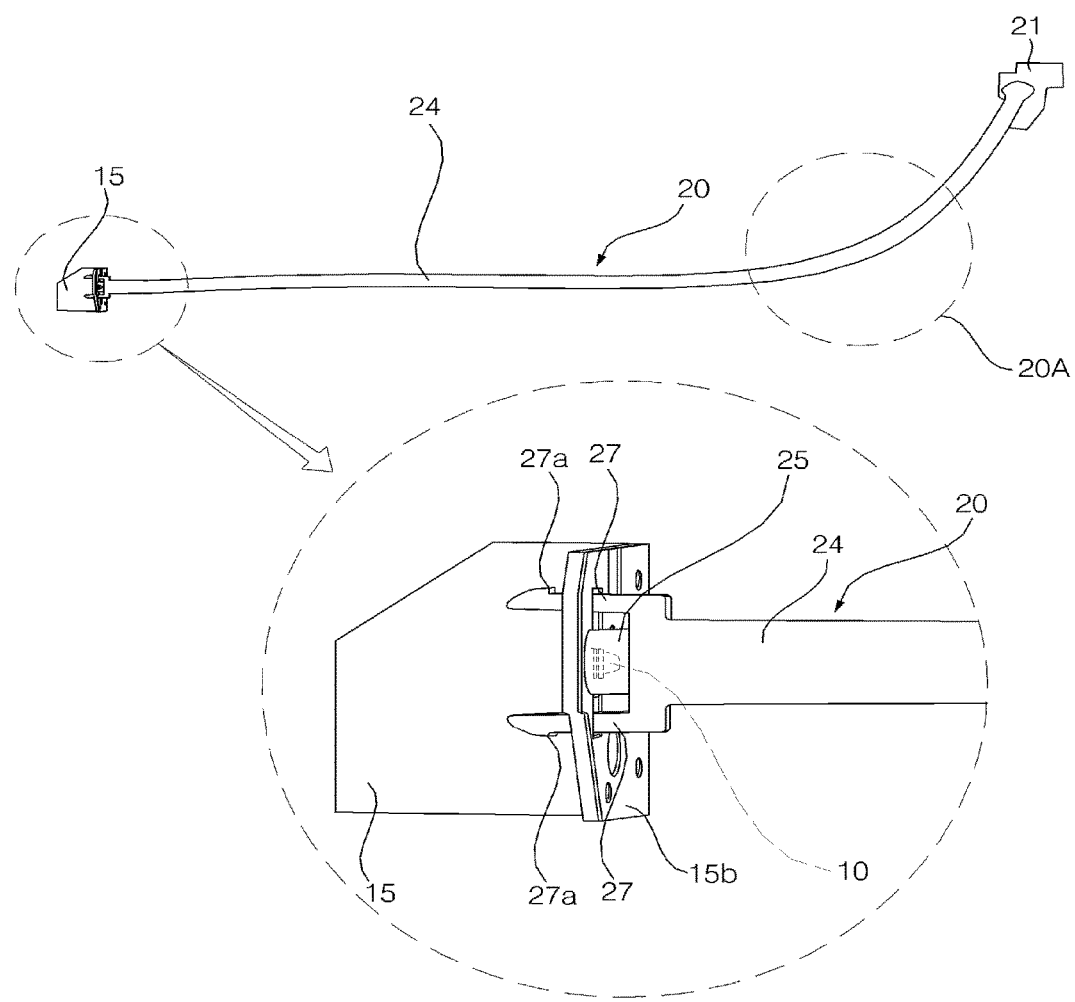
FIG. 2 is a view illustrating a light guide and a base plate, which are illustrated in FIG. 1.
Figure 3:
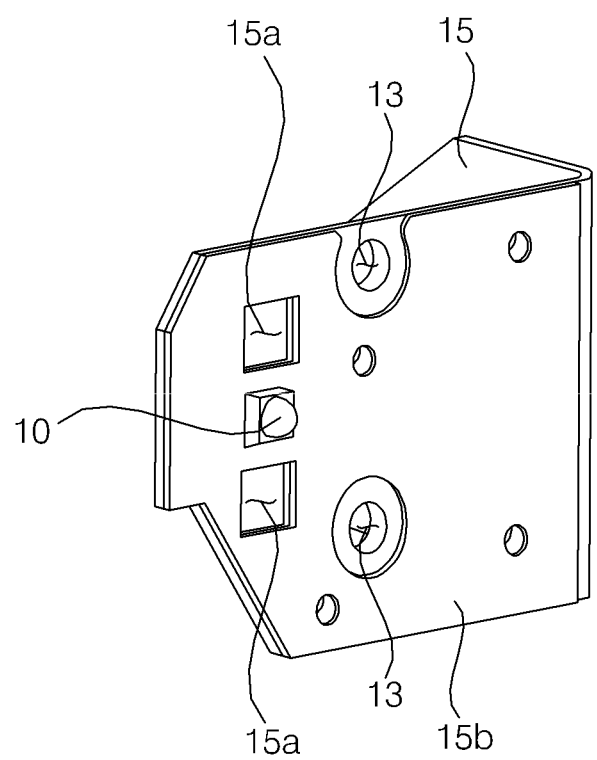
FIG. 3 is a view illustrating the base plate illustrated in FIG. 1.
Figure 4:
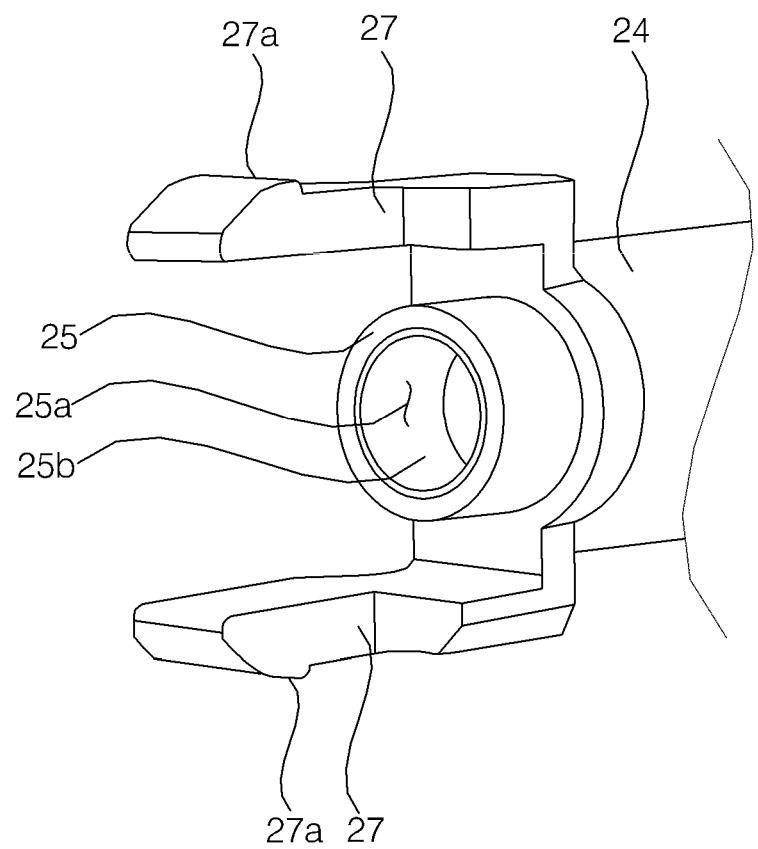
FIG. 4 is a view illustrating a light receiving portion of the light guide illustrated in FIG. 1.
Figure 5:
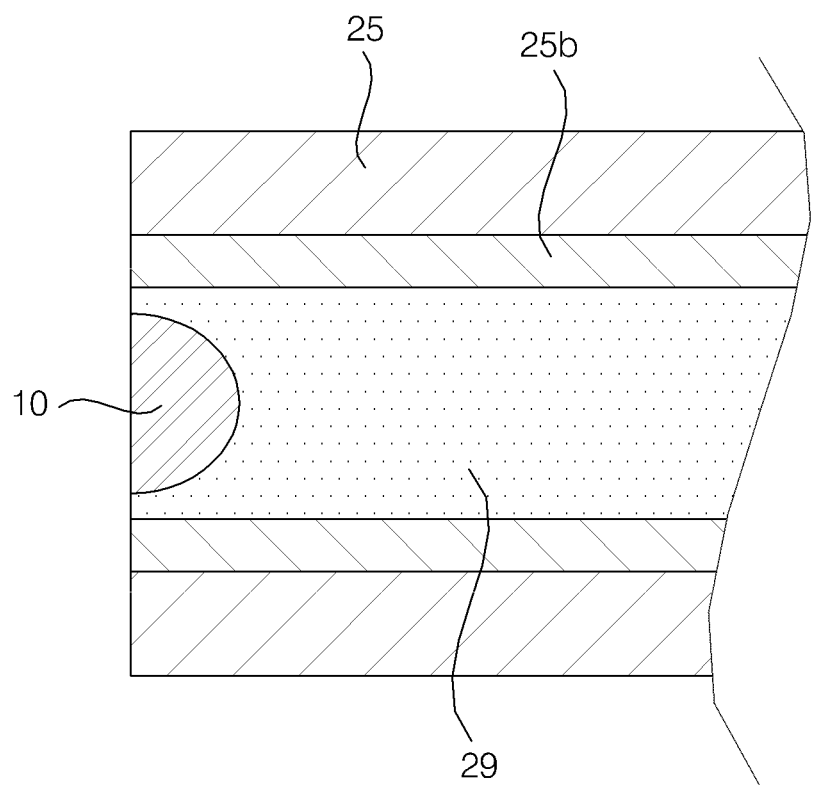
FIG. 5 is a sectional view illustrating a state in which a light source illustrated in FIG. 2 is coupled to the light receiving portion.

FIG. 1 is a view illustrating a lighting device of a vehicle according to an exemplary embodiment of the present invention. FIG. 2 is a view illustrating a light guide and a base plate, which are illustrated in FIG. 1. FIG. 3 is a view illustrating the base plate illustrated in FIG. 1. FIG. 4 is a view illustrating a light receiving portion of the light guide illustrated in FIG. 1. FIG. 5 is a sectional view illustrating a state in which a light source illustrated in FIG. 2 is coupled to the light receiving portion.

Referring to FIGS. 1 to 5, the vehicle lighting device according to the illustrated embodiment of the present invention includes a base plate 15, a light guide 20, and a back cover 30.

A light source 10 is mounted on the base plate 15. The light source 10 includes a light emitting diode (LED), and a cover made of a silicon material. The cover encloses the LED, to seal the LED. The base plate 15 is constituted by a printed circuit board (PCB) or a flexible PCB (FPCB), on which a circuit to supply electric power to the light source 10. The light source 10 generates light by electric power supplied thereto through the circuit printed on the base plate 15.

The base plate 15 is coupled to one side surface of the back cover 30, namely, one end of the back cover 30, by screws 12. Fastening holes 13 are formed through the base plate 15, to receive respective screws 12. The screws 12 are fastened to the back cover 30 while being inserted into respective fastening holes 13 and, as such, the base plate 15 is coupled to the back cover 30.

The light guide 20 is made of a flexible material while having a certain length. The light guide 20 is coupled, at one longitudinal end thereof, to the base plate 15 while being coupled, at the other longitudinal end thereof, to a vehicle body. A mounting bracket 21 is mounted to the other end of the light guide 20. The mounting bracket 21 is coupled to the vehicle body and, as such, the other end of the light guide 20 is coupled to the vehicle body via the mounting bracket 21. In the illustrated embodiment, the light guide 20 is formed to have a circular cross-section, but is not limited thereto. For example, the light guide 20 may have a plate shape.

Light generated by the light source 10 is incident upon one end of the light guide 20. The light incident upon one end of the light guide 20 passes through the interior of the light guide 20 in a longitudinal direction of the light guide 20 and, as such, the light guide 20 emits light.

The light guide 20 includes a light emitting portion 24 for performing light emission using light generated by the light source 10, and a light receiving portion 25 formed at one longitudinal end of the light emitting portion 24, to receive light generated by the light source 10.

The light receiving portion 25 protrudes from one end of the light emitting portion 24 while having a circular cross-sectional shape. The light source 10 is disposed within the light receiving portion 25. A circular light receiving groove 25a is formed at the light receiving portion 25. The light source 10 is inserted into the light receiving groove 25a and, as such, is disposed within the light receiving portion 25. The light receiving portion 25 and light receiving groove 25a may have various shapes in accordance with the shape of the light source 10.

When an air layer is present between the light source 10 and the light guide 20, light generated by the light source 10 may be totally or partially reflected while passing through the air layer and, as such, light loss may occur. In this case, the medium, through which light moves, is increased, as compared to the case in which there is no air layer. For this reason, the transmittance of light incident from the light source 10 upon the light guide 20 is lowered, thereby resulting in degradation of luminous efficacy.

To this end, in order to prevent presence of an air layer between the light source 10 and the light guide 20, the light receiving portion 25 contacts, at a protruding end thereof, a surface of the base plate 15, on which the light source 10 is mounted, such that introduction of air into the light receiving groove 25a of the light receiving portion 25 is prevented.

A sealing member 29 fills the light receiving groove 25a. The sealing member 29 seals a space between the light source 10 and the light receiving portion 25, thereby causing light generated by the light source 10 to be incident upon the light guide 20 without passing through any air layer. The sealing member 29 also functions to couple the light source 10 to the light receiving portion 25. Since the sealing member 29 is present between the light source 10 and the light receiving portion 25, in place of air, the sealing member 29 is preferably made of a material having a higher refractive index than air. In the illustrated embodiment, the sealing member 29 is made of ultraviolet (UV) silicon.

UV silicon exhibits a higher refractive index and a higher thermal conductivity than air. In the illustrated embodiment, when air is a reference medium (refractive index=1), an LED having a refractive index of about 3 is used as the light source 20, and UV silicon having a refractive index of about 1.5 is used for the sealing member 29.

Since the refractive index of air is 1, the refractive index difference between the light source 10 and air when the light source 10 is disposed outside the light guide 20 without being inserted into the light receiving portion 25, namely, without being disposed within the light receiving portion 25, corresponds to a value of 2 obtained by deducting the refractive index of air, namely, 1, from the refractive index of the light source 10, namely, 3. In this case, a critical total reflection angle of light passing through air after being generated by the light source 10 is about 33.9°.

On the other hand, in the illustrated embodiment, the refractive index difference between the light source 10 and the sealing member 29 corresponds to a value of 1.5 obtained by deducting the refractive index of the sealing member 29, namely, 1.5, from the refractive index of the light source 10, namely, 3. In this case, the refractive index difference is less than that of the case in which the light source 10 is disposed outside the light guide 20. In addition, a high critical total reflection angle of about 52.4° is exhibited. Thus, an enhancement in luminous efficacy is achieved.

The light receiving portion 25 is plasma-treated at an inner surface thereof, to form a plasma-treated surface 25b.

The plasma-treated surface 25b causes the sealing member 29 to closely contact the inner surface of the light receiving portion 25.

One end of the light guide 20, at which the light receiving portion 25 is formed, is coupled to the base plate 15. For coupling of one end of the light guide 20 to the base plate 15, a hook hole 15a is formed at the base plate 15, and a hook member 27 is formed at one end of the light guide 20 such that the hook member 27 is inserted into the hook hole 15a, to be coupled to the base plate 15. In the illustrated embodiment, two hook holes 15a and two hook members 27 are formed. The light source 10 is disposed between the two hook holes 15a, and the light receiving portion 25 is disposed between the two hook members 27.

A hook 27a is formed at a free end of each hook member 27. Under the condition that each hook member 27 is inserted into the corresponding hook hole 15a, the hook 27a of the hook member 27 is engaged with a surface of the base plate 15 opposite to the surface of the base plate 15, on which the light source 10 is mounted, namely, a back surface of the base plate 15, and, as such, the hook member 27 is prevented from being separated from the substrate 15.

For elastic engagement of the hooks 27a of the hook members 27 with the back surface of the base plate 15, the hook members 27 are formed to protrude from one end of the light guide 10 by a predetermined length. That is, when the hook members 27 are inserted into the hook holes 15a, the insertion is achieved as the spacing between the hook members 27 is narrowed. After completion of the insertion of the hook members 27 into the hook holes 15a, the spacing between the hook members 27 is widened and, as such, the hooks 27a are engaged with the back surface of the base plate 15.

Since each hook member 27 protrudes beyond the light receiving portion 25, the protruding end of the light receiving portion 25 contacts the surface of the base plate 15, on which the light source 10 is mounted, under the condition that the hook member 27 is coupled to the base plate 15.

The base plate 15 has a plasma-treated surface 15b at the surface thereof on which the light source 10 is mounted. Accordingly, the protruding end of the light receiving portion 25 closely contacts the plasma-treated surface 15b under the condition that the hook members 27 are coupled to the base plate 15.

The light emitting portion 24 of the light guide 20 is mounted on the front surface of the back cover 30. The back cover 30 supports the light guide 20 made of a flexible material under the condition that the light guide 20 is mounted in a bent state, in order to maintain the bent shape of the light guide 20. The back cover 30 preferably has a shape corresponding to the bent shape of the light guide 20.

Hereinafter, an assembly procedure of the vehicle lighting device having the above-described configuration according to the illustrated embodiment of the present invention will be described. Of course, assembly for completion of the vehicle lighting device according to the illustrated embodiment of the present invention, as shown in FIG. 1, may be carried out in an order different from the following assembly order.

First, the inner surface of the light receiving portion 25 formed at the light guide 20 is plasma-treated, to form the plasma-treated surface 25b.

Thereafter, UV silicon in a soft state fills the light receiving groove 25a, which is formed at the light receiving portion 25. The UV silicon forms the sealing member 29 in accordance with curing thereof.

Subsequently, the surface of the base plate 15, at which the light source 10 is disposed, is plasma-treated, to form the plasma-treated surface 15b.

Thereafter, the light source 10 is inserted into the light receiving groove 25a filled with the UV silicon, and, at the same time, the hook members 27 are inserted into the hook holes 15a, respectively, to couple the light guide 20 to the base plate 15. In this state, the light source 10 is maintained in a state of being inserted into the light receiving portion 25 such that the space between the light source 10 and the light receiving portion 25 is sealed by the sealing member 29. As the UV silicon forms the sealing member 29 in accordance with curing thereof, the state of FIG. 2 is obtained.

Subsequently, the light emitting portion 24 of the light guide 20 is mounted on the front surface of the back cover 30. The base plate 15 is then coupled to one side surface of the back cover 30, namely, one end of the back cover 30. Thus, assembly of the vehicle lighting device according to the illustrated embodiment of the present invention is completed.

Figure 6:
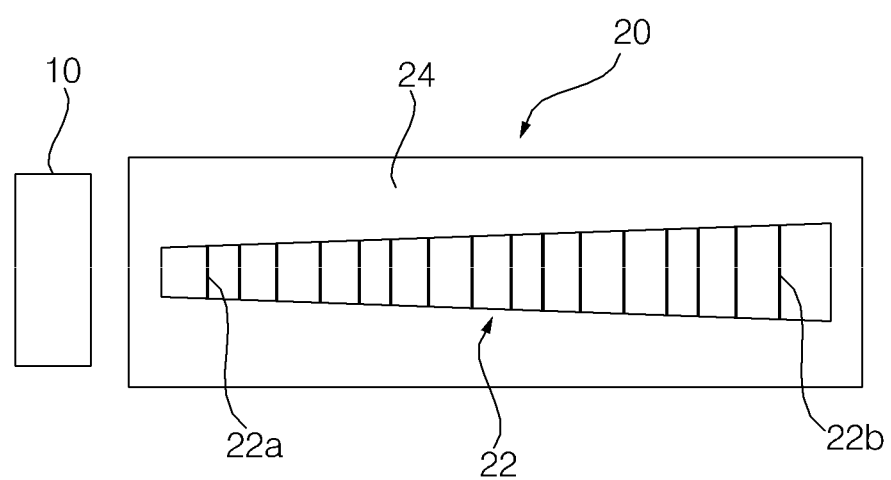
FIG. 6 is a view illustrating first patterns formed inside of the light emitting portion of the light guide illustrated in FIG. 1.

FIG. 6 is a view illustrating first patterns formed inside of the light emitting portion of the light guide illustrated in FIG. 1.

Referring to FIG. 6, a plurality of first patterns 22 is formed inside of the light emitting portion 24 of the light guide 20. The first patterns 22 totally or partially reflect light incident upon the light emitting portion 24 in order to emit the reflected light outwardly of the light emitting portion 24. That is, in the light emitting portion 24, light incident upon the light emitting portion 24 after being generated by the light source 10 is guided from one end of the light emitting portion 24 to the other end of the light emitting portion 24 by the first patterns 22.

The plurality of first patterns 22 is formed to have a greater width (vertical length) with increasing distance from the light source 10. That is, the first pattern 22 nearest to the light source 10, namely, a pattern 22a, has a minimum vertical length, and the first pattern 22 farthest from the light source 10, namely, a pattern 22b, has a maximum vertical length. Upper ends of the remaining first patterns 22 are arranged on a virtual straight line connecting an upper end of the pattern 22a having the minimum vertical length and an upper end of the pattern 22b having the maximum vertical length. Similarly, lower ends of the remaining first patterns 22 are arranged on a virtual straight line connecting a lower end of the pattern 22a having the minimum vertical length and a lower end of the pattern 22b having the maximum vertical length. In addition, the distance between adjacent ones of the first patterns 22 is constant.

Since the plurality of first patterns 22 is formed to have a greater width (vertical length) with increasing distance from the light source 10, the light emitting portion 24 of the light guide 20 may uniformly emit light throughout the length thereof.

Meanwhile, referring to FIG. 2, in the case in which the light guide 20 is mounted on the back cover 20 in a bent state, the light guide 20 includes a curved portion 20A, which is a portion mounted on the back cover 20 in a bent state. Since the amount of light is increased when passing through the curved portion 20A, the curved portion 20A may be excessively brightened. In order to prevent excessive brightening of the curved portion 20A, the patterns formed at the curved portion 20A preferably have a reduced distance, as compared to the patterns formed at a portion of the light guide 20, except for the curved portion 20A.

Figure 7:
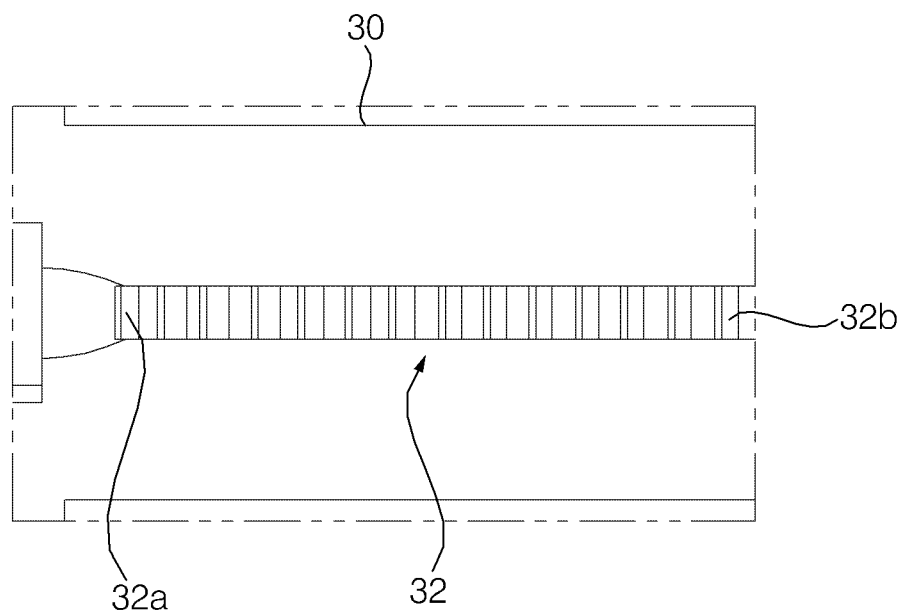
FIG. 7 is a view illustrating second patterns formed at the back cover illustrated in FIG. 1.

FIG. 7 is a view illustrating second patterns formed at the back cover illustrated in FIG. 1.

Referring to FIG. 7, a plurality of second patterns 32 is formed in a longitudinal direction at a portion of the back cover 20, on which the light emitting portion 24 of the light guide 20 is mounted. The plurality of second patterns 32 is formed to have the same width (vertical length). That is, the second pattern 32 nearest to the light source 10, namely, a pattern 32a, has the same vertical length as the second pattern 32 farthest from the light source 10, namely, a pattern 32b. Upper ends of the remaining second patterns 32 are arranged on a virtual straight line connecting an upper end of the pattern 32a nearest to the light source 10 and an upper end of the pattern 32b farthest from the light source 10. Similarly, lower ends of the remaining second patterns 32 are arranged on a virtual straight line connecting a lower end of the pattern 32a nearest to the light source 10 and a lower end of the pattern 32b farthest from the light source 10. In addition, the distance between adjacent ones of the second patterns 32 is constant.

At least the portion of the back cover 30, at which the plurality of second patterns 32 is formed, forms a reflecting portion for again reflecting light emitted from the light emitting portion 24 onto the light emitting portion 24. The reflecting portion may be formed through deposition of an aluminum material capable of reflecting light onto the surface of the back cover 30.

Figure 8:
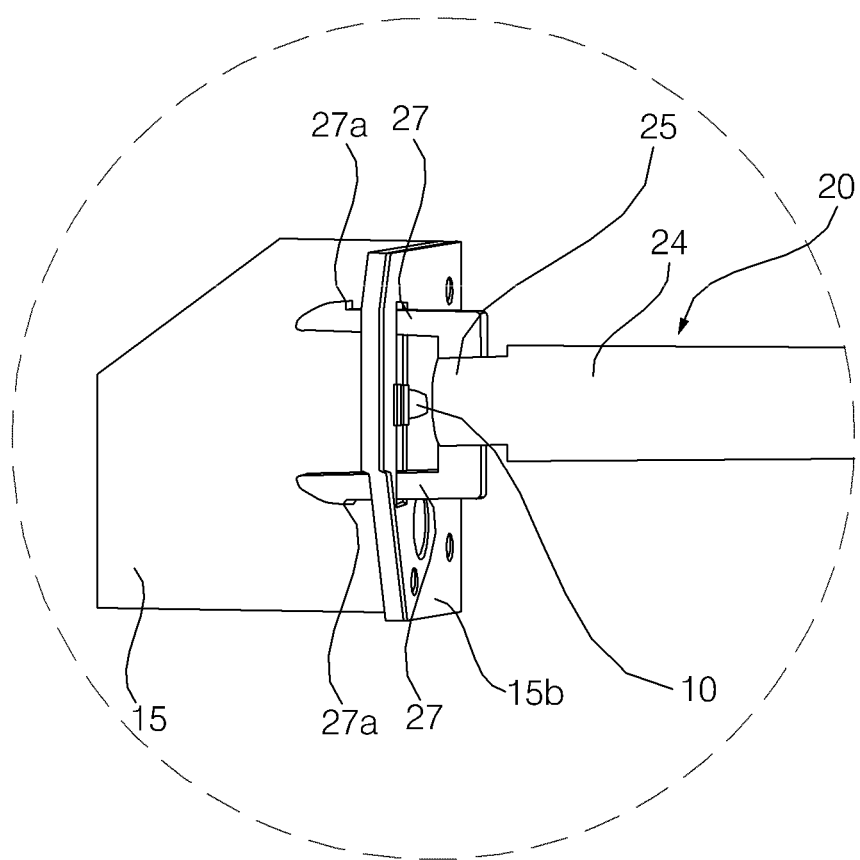
FIG. 8 is a view illustrating a lighting device of a vehicle according to another embodiment of the present invention.

FIG. 8 is a view illustrating a lighting device of a vehicle according to another embodiment of the present invention. In this embodiment, the same constituent elements as those of the previous embodiment will be designated by the same reference numerals, respectively, and no detailed description thereof will be given. Configurations of this embodiment different from those of the previous embodiment will only be described.

Referring to FIG. 8, it can be seen that the vehicle lighting device according to this embodiment differs from that of the previous embodiments. That is, in the previous embodiment, the protruding end of the light receiving portion 25 is disposed to contact the surface of the base plate 15, on which the light source 10 is mounted. In the embodiment of FIG. 8, however, the protruding end of the light receiving portion 25 is spaced apart from the surface of the base plate 15, on which the light source 10 is mounted, and, as such, the light source 10 is spaced apart from the light receiving portion 25. In the embodiment of FIG. 8, accordingly, light generated by the light source 10 moves to the light emitting portion 24 after being incident upon the light receiving groove 25a of the light receiving portion 25.

Figure 9:
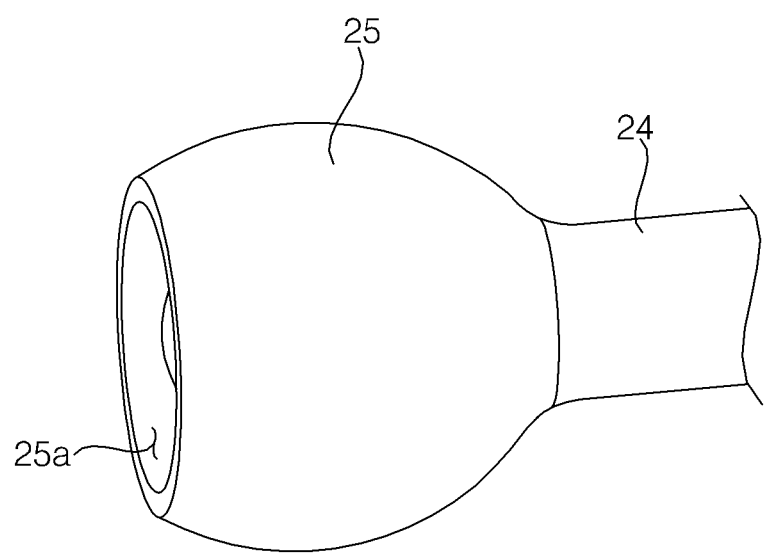
FIG. 9 is a view illustrating a lighting device of a vehicle according to another embodiment of the present invention.
Figure 10:
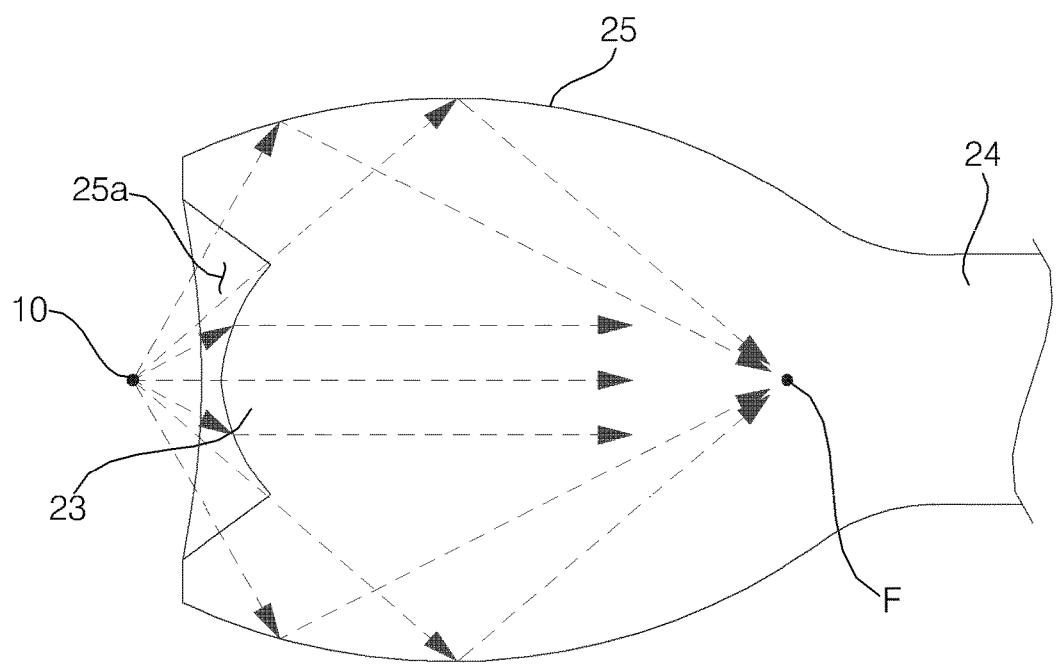
FIG. 10 is a sectional view corresponding to FIG. 9.

FIG. 9 is a view illustrating a lighting device of a vehicle according to another embodiment of the present invention. FIG. 10 is a sectional view corresponding to FIG. 9. In this embodiment, the same constituent elements as those of the embodiment of FIG. 1 will be designated by the same reference numerals, respectively, and no detailed description thereof will be given. Configurations of this embodiment different from those of the embodiment of FIG. 1 will only be described.

Referring to FIGS. 9 and 10, it can be seen that the vehicle lighting device according to this embodiment differs from that of the embodiment of FIG. 1. That is, in the embodiment of FIG. 1, the light receiving portion 25 of the light guide 20 has a circular cross-sectional shape. In the embodiment of FIGS. 9 and 10, however, the light receiving portion 25 of the light guide 20 has an oval cross-sectional shape.

The oval light receiving portion 25 focuses, onto a light receiving surface of the light emitting portion 24, light incident upon the light receiving groove 25a after being generated by the light source 10, thereby forming a focal point F.

The oval light receiving portion 25 is formed with a convex part 23 protruding into the light receiving groove 25a. The convex part 23 guides light incident upon the light receiving groove 25a such that the light moves straight to the light emitting portion 24. The convex part 23 is preferably centrally formed at the light receiving portion 25.

As apparent from the above description, the vehicle lighting device according to each embodiment of the present invention may provide a uniform lighting image without forming dark areas because the plurality of first patterns 22, which has a greater width (vertical length) with increasing distance from the light source 10, is formed at the light emitting portion 24 of the light guide 20.

In addition, since the plurality of second patterns 32, which has the same width (vertical length), is formed at a portion of the back cover 30, on which the light emitting portion 24 of the light guide 20 is mounted, it may be possible to prevent the first patterns 24 from being non-uniformly viewed at the outside of the light guide 20 in an OFF state of the light source 10.

The features, structures, effects, etc. as described above are included in at least one embodiment, and are not limited to a particular embodiment. In addition, although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lighting device of a vehicle comprising:
   a light source configured to generate light;
   a light guide configured to guide light and comprising a light emitting portion formed with a plurality of first patterns arranged in a longitudinal direction of the light emitting portion for performing light emission and a light receiving portion to receive the light generated by the light source; and
   a back cover, on which the light guide is mounted, the back cover being formed with a plurality of second patterns arranged in a longitudinal direction of the back cover at a portion of the back cover, on which the light emitting portion is mounted,
   wherein the plurality of first patterns is formed to have a greater width with increasing distance from the light source, and the plurality of second patterns is formed to have the same width,
   wherein the light guide is made of a flexible material and comprising a curved portion to be mounted on the back cover in a bent state, wherein the plurality of first patterns formed at the curved portion comprise a smaller spacing than the plurality of first patterns formed at a portion of the light guide other than the curved portion.

2. The lighting device according to claim 1, wherein:
   a line connecting upper ends of the plurality of first patterns and a line connecting lower ends of the plurality of first patterns are straight lines, respectively; and
   a line connecting upper ends of the plurality of second patterns and a line connecting lower ends of the plurality of second patterns are straight lines, respectively.

3. The lighting device according to claim 1, wherein:
   the plurality of first patterns has the same spacing; and
   the plurality of second patterns has the same spacing.

4. The lighting device according to claim 1, wherein at least the portion of the back cover, at which the plurality of second patterns is formed, forms a reflecting portion for reflecting light emitted from the light emitting portion onto the light emitting portion.

5. The lighting device according to claim 1, wherein the light receiving portion is formed with a light receiving groove to receive light generated by the light source.

6. The lighting device according to claim 5, wherein the light receiving portion focuses, onto a light receiving surface of the light emitting portion, light incident upon the light receiving groove after being generated by the light source, thereby forming a focal point.

7. The lighting device according to claim 5, wherein:
the light receiving portion is formed with a convex part protruding into the light receiving groove; and
the convex part guides light incident upon the light receiving groove such that the light moves straight to the light emitting portion.

8. The lighting device according to claim 1, wherein the light source is spaced apart from the light receiving portion.

9. A lighting device of a vehicle comprising:
a light source configured to generate light;
a light guide configured to guide light and comprising a light emitting portion formed with a plurality of first patterns arranged in a longitudinal direction of the light emitting portion for performing light emission and a light receiving portion to receive the light generated by the light source; and
a back cover, on which the light guide is mounted, the back cover being formed with a plurality of second patterns arranged in a longitudinal direction of the back cover at a portion of the back cover, on which the light emitting portion is mounted, wherein the plurality of first patterns is formed to have a greater width with increasing distance from the light source, and the plurality of second patterns is formed to have the same width,
wherein the light source is disposed within the light receiving portion in an inserted state,
wherein the lighting device further comprises a sealing member disposed within the light receiving portion, to couple the light source to the light receiving portion.

10. The lighting device according to claim 9, further comprising:
a plasma-treated surface provided at an inner surface of the light receiving portion, the plasma-treated surface closely contacting the sealing member.

11. A lighting device of a vehicle comprising:
a light source configured to generate light;
a light guide configured to guide light and comprising a light emitting portion formed with a plurality of first patterns arranged in a longitudinal direction of the light emitting portion for performing light emission and a light receiving portion to receive the light generated by the light source;
a back cover, on which the light guide is mounted, the back cover being formed with a plurality of second patterns arranged in a longitudinal direction of the back cover at a portion of the back cover, on which the light emitting portion is mounted, wherein the plurality of first patterns is formed to have a greater width with increasing distance from the light source, and the plurality of second patterns is formed to have the same width;
a base plate, on which the light source is mounted, wherein the base plate is coupled to the back cover; and
a plasma-treated surface provided at a surface of the base plate, on which the light source is mounted, the plasma-treated surface closely contacting a protruding end of the light receiving portion.

12. The lighting device according to claim 11, wherein:
the base plate is formed with a hook hole; and
the light guide is formed, at one end thereof, with a hook member to be inserted into the hook hole and engaged with the base plate.

\* \* \* \* \*